J. C. BARBER.
CAR TRUCK.
APPLICATION FILED JAN. 25, 1909.
945,672.
Patented Jan. 4, 1910.
3 SHEETS—SHEET 1.
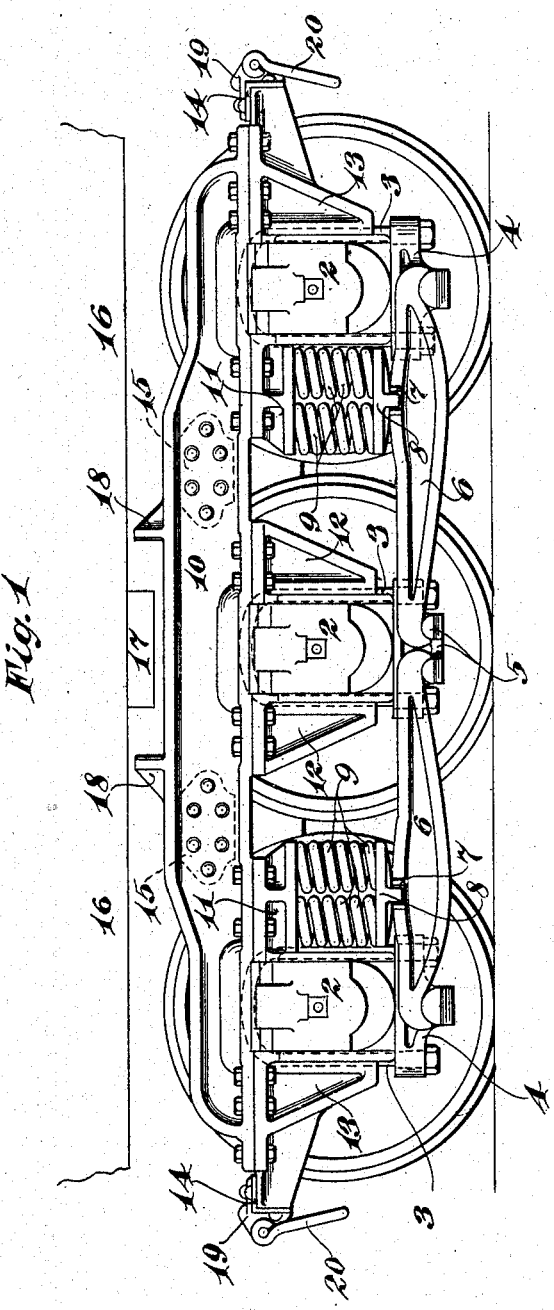
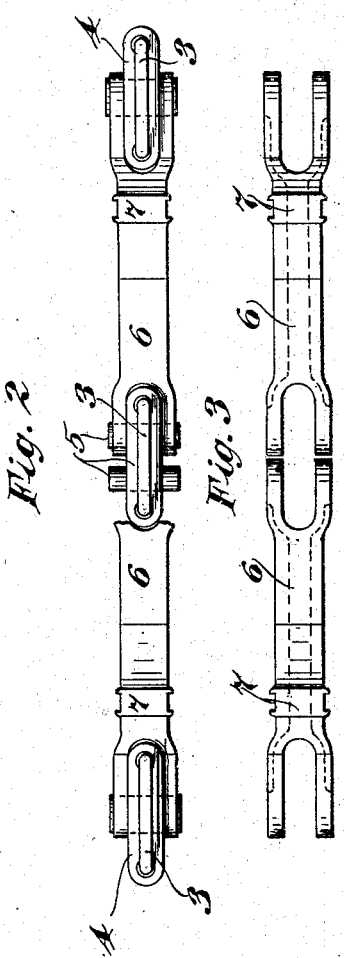
Witnesses:
L. L. Simpson
A. H. Opsahl
Inventor:
John C. Barber,
By his Attorneys:
Williamson & Merchant

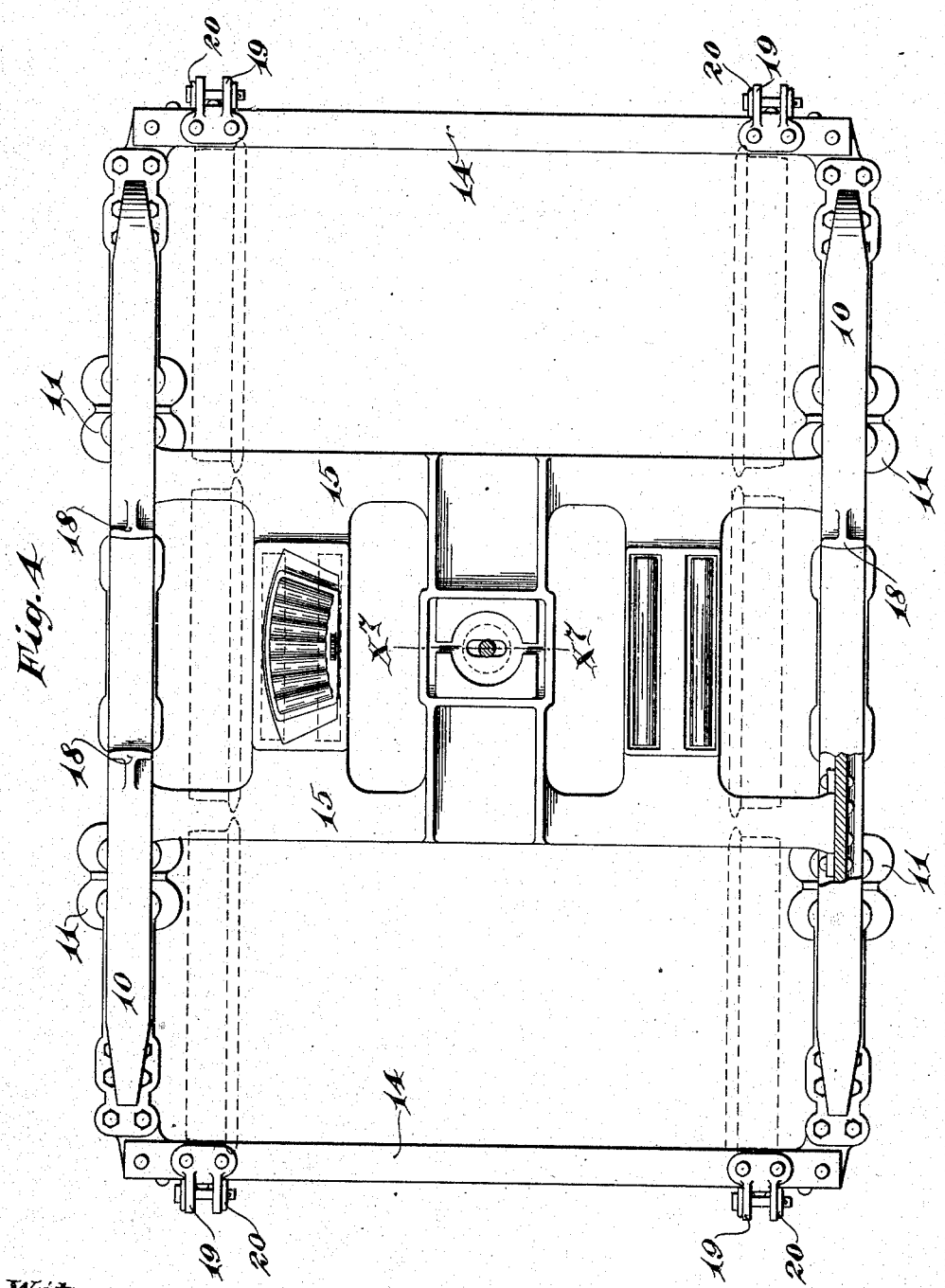

J. C. BARBER.
CAR TRUCK.
APPLICATION FILED JAN. 25, 1909.
945,672.
Patented Jan. 4, 1910.
3 SHEETS—SHEET 3.
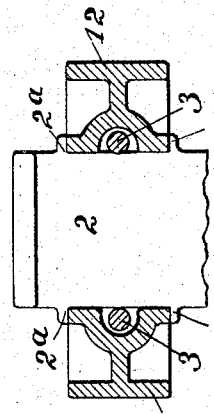
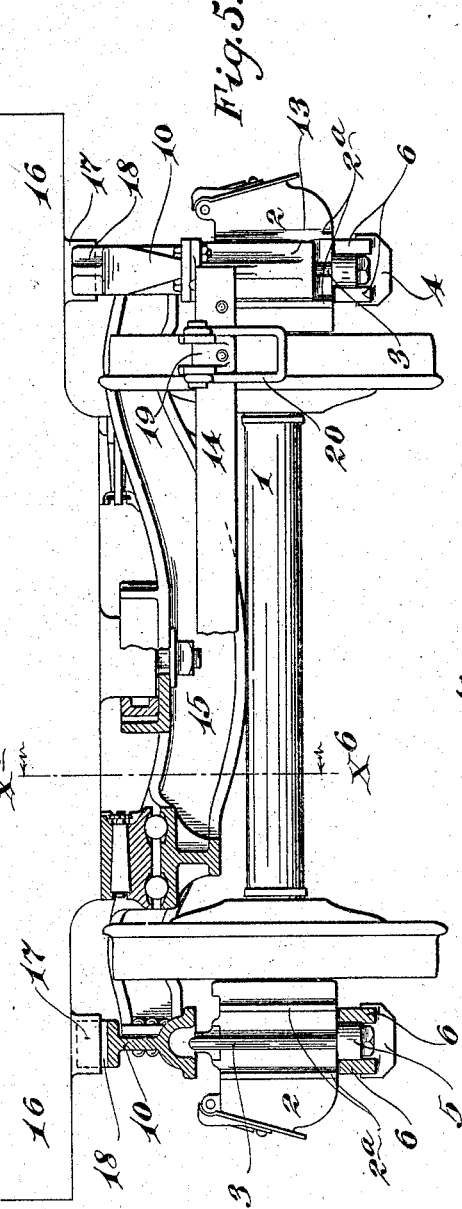
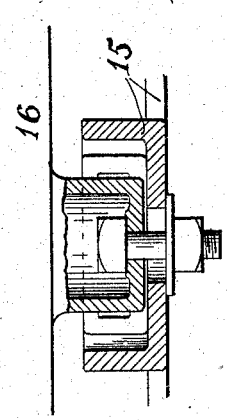
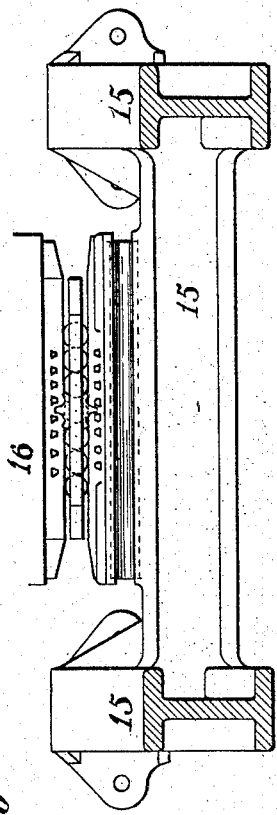
Witnesses:
L. L. Simpson
A. H. Opsahl
Inventor:
John C. Barber
By his Attorneys:
Williamson & Merchant

UNITED STATES PATENT OFFICE.

JOHN C. BARBER, OF CHICAGO, ILLINOIS.

CAR-TRUCK.

945,672.  Specification of Letters Patent.  Patented Jan. 4, 1910.

Application filed January 25, 1909. Serial No. 473,987.

*To all whom it may concern:*

Be it known that I, JOHN C. BARBER, a citizen of the United States, residing at Chicago, in the county of Cook and State of Illinois, have invented certain new and useful Improvements in Car-Trucks; and I do hereby declare the following to be a full, clear, and exact description of the invention, such as will enable others skilled in the art to which it appertains to make and use the same.

My invention has for its object to provide a car truck of large capacity and short wheel base; and to this end the invention consists of the novel devices and combination of devices hereinafter described and defined in the claims.

The invention was especially designed to afford such a six wheel truck.

It is well known to persons familiar with the business that the modern trend of development in railway rolling stock has been to employ cars of larger and larger capacity. The point has now been reached where there is a general demand for freight cars which will carry as high as 150,000 or 200,000 pounds. It is equally well known that there is a limit to the weight which truck wheels will stand. Otherwise stated, it is impracticable to carry such enormous loads as 150,000 or 200,000 pounds on two pair of four-wheel trucks. Attempts have been made to meet the demand by the use of three four-wheel trucks, to-wit, one in the center and one at each end of the car. This has not proved satisfactory.

Six-wheel trucks have been proposed for passenger traffic, but never, so far as I am aware, with a wheel base of less than 10½ feet. Such a long wheel base was deemed necessary in order to get space for the equalizers and the supporting springs upon which the long main frame was mounted. Such a long wheel base is a great drawback to the satisfactory handling of heavily loaded cars on curves.

By my invention, I get a six-wheel truck with abundance of room for all the needed parts, within a wheel base of six feet, or practically the same as that of the ordinary standard four-wheel truck. My new six-wheel truck, therefore, will travel on curves just as freely as the old four-wheel truck; and two such six-wheel trucks located one at each end of the car, will support and carry the large load much better than three four-wheel trucks with one thereof located in the center of the car.

The invention is illustrated in the accompanying drawings, wherein like references refer to like parts throughout the several views.

In said drawings, Figure 1 is a view of the truck in side elevation, with some parts removed and the position of the car body shown in diagram lines; Fig. 2 is a detail in plan view, showing the equalizers and some of their supporting elements detached; Fig. 3 is a detail in plan showing the equalizers detached from their bearings; Fig. 4 is a plan view of the truck with some of the parts removed; Fig. 5 is a view of the truck partly in central cross section and partly in end elevation; Fig. 6 is a detail in section through the truck frame lengthwise thereof on the line $x^6$ $x^6$ of Fig. 6; Fig. 7 is a detail through the swiveling center plate devices on the line $x^7$ $x^7$ of Fig. 4; and Fig. 8 is a detail partly in plan and partly in horizontal section, showing the relation of a pair of frame pedestals to one of the journal boxes and yokes.

The truck axles 1 are fitted with journal boxes 2 of the standard or any other suitable form; and these boxes 2 are provided with the customary pedestal guides $2^a$ (Figs. 5 and 8). The journal boxes 2 carry clevis-like yokes 3 which embrace the boxes, are screw threaded and nutted at their lower ends, and support equalizer bearings, marked respectively 4 and 5,—4 being the end members and 5 the central member of these bearings.

The numeral 6 represents the equalizer levers which have bifurcated hook-shaped ends resting on the said bearings 4 and 5. The central bearing 5 differs from the end bearings 4 only in the fact that it is made double, so as thereby to be adapted to support the inner ends of both of the equalizer levers 6. The bearings 4 and 5 are so shaped at their central portions that the end prongs of the levers will embrace the same, as clearly shown in Fig. 2 of the drawings. The yokes 3 take hold of these enlarged central portions of the bearings 4. This, it will be seen, prevents any lateral displacement of the equalizer levers 6 while permitting the same to be readily applied to or removed from their working position. With the said parts 3, 4, 5 and 6 related as above described, it is obvious that the equalizers 6 are supported on the said bearings 4 and 5, by their hook-shaped ends, with freedom for pivotal motion in respect to said bearings and in respect to each other. This affords the basis for the double action of this truck. Said equalizers 6 are provided with suitable seats 7 for spring base plates 8. On the base plates 8 are mounted the frame supporting springs 9. The side frames 10 are provided with spring caps 11 in the form of heavy blocks bolted or otherwise rigidly secured to the body portion of the side frame and resting on the springs 9. The side frames 10 also have central pedestals 12 and end pedestals 13. The central pedestals 12 embrace the journal boxes of the central truck axle and are guided thereby. The end pedestals 13 engage with the outer end vertical faces of the journal boxes of the end truck axles and the spring caps 11 are fixed to the side frames in such position as to embrace the inner vertical faces of the said end journal boxes. Hence, the parts 11 and 13 coöperate with the boxes embraced thereby in the pedestal action. The side frames 10, spring caps 11 and pedestals 12 and 13 are so formed that they will span the yokes 3 and afford the necessary clearance for the up and down motion of the side frames under the spring action without bringing the frame down onto the yokes. This relation is illustrated in Figs. 1, 5 and 8. Said parts 11 are, in fact, combined spring caps and pedestals.

The side frames 10 are rigidly connected by end cross ties 14 and a wide double ended central transom 15 shown as riveted to the side frames at points midway between the central and the end truck axles. This central transom 15 supports the car body 16, and, because of its function, may be termed the cradle of the truck. This cradle 15 is of such shape that the portions thereof, which take the load, are preferably below the tops of the wheels, as best shown in Fig. 5. The car body 16 is carried by the said cradle portion 15 of the rigid truck frame, with freedom for the customary swiveling or radial action and also with freedom for a limited lateral travel relative to said truck frame; and both of these motions are taken on anti-friction bearings. The swiveling connections and the anti-friction bearings are, in principle, of the same kind as those disclosed in my prior patents No. 863,012 of August 13, 1907, and No. 875,565, of date December 31, 1907, and the Lake and Deverell patent No. 798,250 of August 29, 1905, referred to in my said Patent 962,012.

As in the said prior patents, the entire load is carried on the roller bearings; and the center or swiveling connections simply hold the truck and car body together with freedom for the swiveling motions, take the forward and backward thrusts and limit the lateral travel of the car body in respect to the truck frame. The only differences in the present case, as compared with said prior patents, are the modifications in the locations of the bearings incidental to their incorporation in this six-wheel truck; and, hence, it is not deemed necessary to specify the said parts in detail. It may be noted, however, that the radial motion of the car body, relative to the truck, is here limited by a set of coöperating stop lugs, marked respectively 17 and 18; of which parts, the lugs 17 depend from the car body or car body bolster 16 and play between the members 18 which are cast integral with and rise from the side frames 10 of the truck frame, as best shown in Figs. 1 and 5.

The truck frame is shown as provided on its end cross ties 14 with hanger lugs 19 for supporting the customary brake hangers 20.

The drawings are made approximately to scale and the scale of the main views 1, 4 and 5 is substantially nine-tenths inch to a foot but whether precisely accurate or not, the wheel base for the six-wheel truck is intended to be about six feet.

From the drawings and the foregoing description, it will be seen that I have here provided a six-wheel truck of great strength, simplicity and compactness of structure and one whereon the load is carried low down. The equalizers are below the truck axles. The center of gravity of the load is, therefore, close to the rail. It would, therefore, be extremely difficult to derail a car having such trucks, otherwise than by spreading of the rails. It is also obvious that the main truck frame, made up of the rigidly connected parts 10, 11, 12, 13, 14 and 15 and the car body carried thereby is free for the required vertical motions as determined by the yielding of its supporting springs 9, while, at the same time, it is securely held and guided by the journal boxes 2 and the coöperating pedestal elements 11, 12 and 13. It is also obvious that either end of the truck may take a limited rocking or up and down motion relative to the other in view of the relations of the equalizer 6 to their respective bearings 4 and 5. Hence, every condition needed in the service is thought here to be met.

All the parts of the truck are preferably made of cast steel, but it will be understood that they might be made of pressed steel or other suitable material. Roll shapes may also be employed.

It will, of course, also be noted that the seats 7 for the spring base plates 8 are so located on the equalizers 6 that the load will be distributed equally to the three truck axles and the three sets of wheels.

The truck illustrated is intended as a freight car truck. By extending the wheel base, room could be afforded for the use of elliptical springs instead of the coiled spring shown and this would adapt the truck for passenger service.

It will be understood that details of the structure can be varied without departing from the spirit of the invention.

Although especially intended for freight cars, it will be understood that this truck is capable of use wherever a short wheel base is desirable. If made of lighter material, for example, it would be well adapted for street cars.

What I claim is:

1. In a car truck, the combination with side frames and journal boxes, of equalizer bearings located below said boxes and rigidly secured in respect thereto, of equalizers fulcrumed at both ends on said equalizer bearings and springs on said equalizers supporting said side frames, and which equalizers are movable in respect to the journal boxes under yielding action of the said springs.

2. In a truck having at least six wheels, the combination with journal boxes and side frames, of equalizer bearings located below said boxes and rigidly secured in respect thereto, equalizers arranged end to end, fulcrumed at both ends on said equalizer bearings, and springs on said equalizers supporting said side frames, and which equalizers are movable in respect to the journal boxes under yielding action of the said springs.

3. In a six-wheel car truck, the combination with the journal boxes, of yokes embracing and carried by said boxes, equalizer bearings carried by said yoke, below the boxes, the central members of which bearings are double, equalizers having their ends pivotally mounted on said bearings and a main frame carried by said equalizers, substantially as described.

4. In a six-wheel car truck, the combination with the journal boxes, of yokes embracing and carried by said boxes, equalizer bearings carried by said yokes, below the boxes, the central members of which bearings are double, equalizers having hook-shaped ends pivotally mounted on said bearings and a main frame carried by said equalizers, substantially as described.

5. In a six-wheel car truck, the combination with the journal boxes, of yokes embracing and carried by said boxes, equalizer bearings carried by said yokes below the boxes, the central members of which bearings are double, equalizers having hook-shaped ends pivotally mounted on said bearings, springs on said equalizers, a main frame carried by said springs and having pedestals engaging and guided by said boxes, and which pedestals are shaped to span and clear said yokes, substantially as described.

6. In a six-wheel car truck, the combination with the journal boxes, of the yokes embracing and carried by said boxes, equalizer bearings carried by said yokes below the boxes, the central members of which bearings are double, and all of which have raised central portions engaged by said yokes, equalizers having bifurcated hook-shaped ends which embrace the raised portions of said bearings and rest on the laterally projecting portions thereof, springs on said equalizers, and a main frame carried by said springs and having pedestals engaging and guided by said boxes, and which main frame and pedestals are formed to span and clear said yokes, substantially as described.

7. In a six-wheel car truck, the combination with the journal boxes, of yokes embracing and carried by said boxes, equalizer bearings carried by said yokes, below the boxes, the central members of which bearings are double, equalizers having their ends pivotally mounted on said bearings, springs on said equalizers and a main frame supported by said springs and which main frame has a central transom rigidly connecting its sides and so shaped as to afford a cradle, below the level of the tops of the wheels, for supporting the car body, substantially as described.

In testimony whereof I affix my signature in presence of two witnesses.

JOHN C. BARBER.

Witnesses:
LEE W. BARBER,
A. M. LOVE.